Aug. 12, 1947.    W. SCHADE    2,425,400
HIGH APERTURE COLLIMATING LENS SYSTEM
Filed Nov. 27, 1943
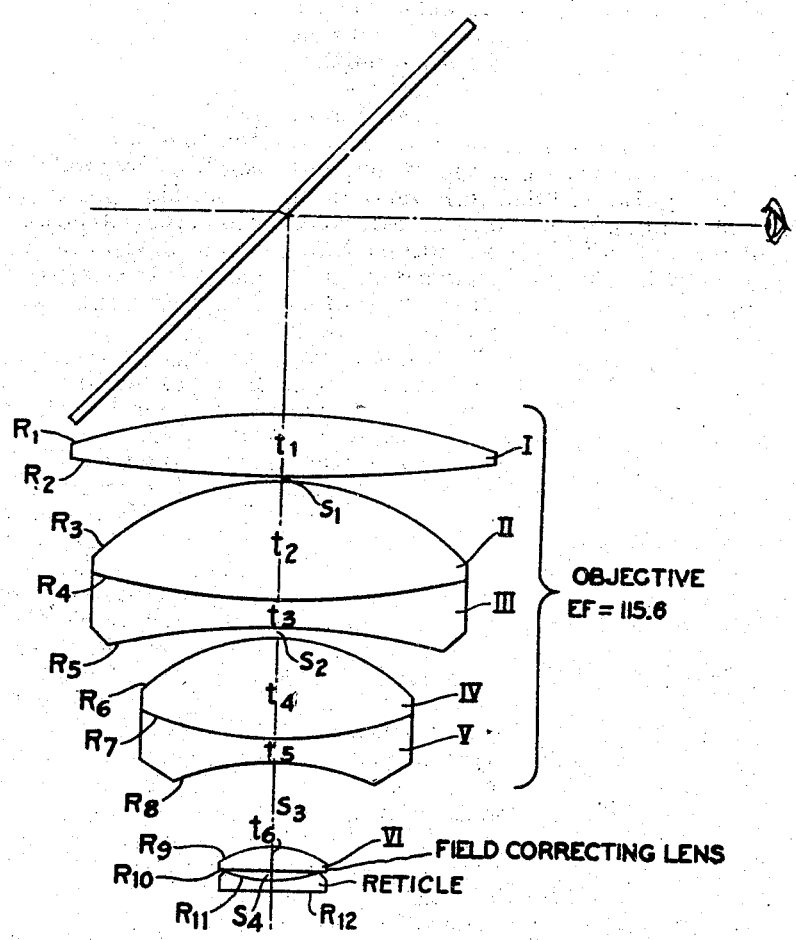
WILLY SCHADE
*INVENTOR*
BY
ATT'Y & AGT Patented Aug. 12, 1947

2,425,400

UNITED STATES PATENT OFFICE 2,425,400

HIGH APERTURE COLLIMATING LENS SYSTEM

Willy Schade, Rochester, N. Y., assignor to Eastman Kodak Company, Rochester, N. Y., a corporation of New Jersey Application November 27, 1943, Serial No. 511,964

9 Claims. (Cl. 88—57)

This invention relates to high aperture collimating lens systems, such as those used in reflex sights.

An object of the invention is to provide a high aperture collimating lens system extremely well corrected for spherical aberration and coma so that when it is used in a reflex sight the shape and position of the reticle image do not change when the eye moves about.

Collimator objectives have long been used for producing a parallel beam of light from a point source for optical signaling and for producing an artificial star image and for other purposes. When a large linear aperture is required, it is usual to make the focal length of the collimator objective longer and keep the relative aperture about the same. For some purposes, however, this takes up too much space and is impractical, for example in reflex sights for airplanes. On the other hand, if the relative aperture is greatly increased, the space occupied could be kept small, but all collimator lenses known heretofore have been afflicted so badly with zonal spherical aberrations as to make them unsatisfactory for many purposes.

For clarity it is pointed out that the convention used in the following description is that of considering the reticle as being behind the collimator lens and the observer as looking into the front. The light source may be behind the reticle, or the reticle may be a surface parts of whose area reflect light while other parts are substantially non-reflecting, in which case the reticle is illuminated from the front through the collimator lens.

According to the present invention, a very high aperture collimator objective, extremely well corrected for spherical aberration and coma, is made up comprising three positive components of which the front one is biconvex with its more strongly curved surface to the front and each of the other two is a meniscus with its front surface more strongly convex than that of the component immediately in front of it, two of the three components being compound, each consisting of a biconvex element cemented onto the front of a negative element whose refractive index is higher on the average for the two components by at least 0.05, and in which the axial thickness of each component is greater than either air space between the components. Preferably the two compound components are specifically the two meniscus components. Also if the latter arrangement is employed, the radius of curvature of each of the two cemented surfaces should be greater than that of either of the other two surfaces of the same component.

This structure is especially useful for collimator objectives having apertures greater than two-thirds the equivalent focal length of the objective. Objectives with a smaller aperture can usually be made satisfactorily with fewer components.

To cover more than a very narrow angular field, I find it convenient to combine with the objective a field correcting lens consisting of a single positive element close to and in front of the focal plane. This improves the image of points off the axis by correcting a small residue of oblique spherical aberration.

These collimating lens systems, like others known before, have an inward curving field and undercorrected Petzval sum. Consequently, a reticle on a plane surface at the principal focus would appear at infinity for the axial point, but the points off the axis would appear to be beyond infinity. In certain preferred cases this difficulty is overcome. If the reticle is to consist of lines crossing each other at the axis, these lines are engraved or otherwise marked on a curved surface substantially matching the sagittal field curve. On the other hand, if the reticle consists of concentric circles, these are engraved or otherwise marked on a curved surface substantially matching the tangential field curve. By this means the whole reticle is made in these cases to appear exactly at infinity.

The accompanying drawing shows a lens system according to the invention and numerical data for a preferred embodiment. This data is repeated here:

*Example*

EF=100   Aperture=f/0.64

| Lens | N | V | Radii | Thicknesses |
|---|---|---|---|---|
| I | 1.517 | 64.5 | $R_1=+253.5$ | $t_1=23.6$ |
|   |   |   | $R_2=-872.$ | $s_1=1.8$ |
| II | 1.517 | 64.5 | $R_3=+97.5$ | $t_2=45.1$ |
|   |   |   | $R_4=-284.$ | |
| III | 1.720 | 29.3 | | $t_3=10.1$ |
|   |   |   | $R_5=+233.$ | $s_2=4.4$ |
| IV | 1.611 | 57.2 | $R_6=+70.8$ | $t_4=37.2$ |
|   |   |   | $R_7=-161.9$ | |
| V | 1.617 | 36.6 | | $t_5=8.3$ |
|   |   |   | $R_8=+101.3$ | $s_3=30.8$ |
| VI | 1.517 | 64.5 | $R_9=+35.7$ | $t_6=8.8$ |
|   |   |   | $R_{10}=\infty$ | $BF=3.5$ |

This objective consists of a biconvex front component, lens I, and two meniscus compound components, and the field correcting lens is the positive component, lens VI. The reticle in this case is illuminated from behind and consists of concentric rings which are engraved on a concave surface $R_{11}$ whose radius of curvature is 0.52 times the focal length of the objective. This is approximately the curvature of the tangential field image. The rear surface $R_{12}$ of the reticle element may be frosted or fine ground for more even illumination. The front surfaces of all the lens components are progressively more strongly curved in the order of their arrangement from front to rear. The cemented surfaces have longer radii of curvature than the respective outer surfaces of the same components, and the index difference at the cemented surfaces are respectively 0.203 and 0.006, so that the average index difference is 0.105. The three components of the objective are each thicker than either air space $s_1$ or $s_2$.

I wish to point out that the invention is not restricted to the example shown, but is of the scope of the appended claims.

What I claim is:

1. A high aperture collimator objective comprising three positive components of which the front one is biconvex with its more strongly curved surface to the front and each of the other two is a meniscus with its front surface more strongly convex to the front than the front surface of the component immediately in front of it, the two meniscus components being compound and each consisting of a bi-convex element cemented onto the front of a negative element whose refractive index is higher than that of the biconvex elements on the average for the two components by at least 0.05, and in which the axial thickness of each component is greater than either airspace between the components.

2. A collimator objective according to claim 1 in which the radius of curvature of each of the two cemented surfaces is greater than that of either of the other two surfaces of the same component.

3. A collimator objective according to claim 1 having an aperture greater than two-thirds the equivalent focal length of the objective.

4. A lens system consisting of a collimator objective according to claim 1 and a positive component consisting of a single positive element close to and in front of the focal plane of the objective.

5. A collimator objective according to claim 1 having an inward curving tangential field image and combined with a reticle consisting of concentric circles on a curved surface substantially matching the curvature of the tangential image.

6. A lens system substantially according to the specifications shown in the following table:

| Lens | N | V | Radii | Thicknesses |
|---|---|---|---|---|
| I | 1.52 | 64 | $R_1=+2.5F$ | $t_1=0.24F$ |
|   |   |   | $R_2=-8.7F$ |   |
|   |   |   |   | $s_1=0.02F$ |
| II | 1.52 | 64 | $R_3=+1.0F$ | $t_2=0.45F$ |
|   |   |   | $R_4=-2.8F$ |   |
| III | 1.72 | 29 |   | $t_3=0.10F$ |
|   |   |   | $R_5=+2.3F$ |   |
|   |   |   |   | $s_2=0.04F$ |
|   |   |   | $R_6=+0.7F$ |   |
| IV | 1.61 | 57 |   | $t_4=0.37F$ |
|   |   |   | $R_7=-1.6F$ |   |
| V | 1.62 | 37 |   | $t_5=0.09F$ |
|   |   |   | $R_8=+1.0F$ |   |
|   |   |   |   | $s_3=0.31F$ |
|   |   |   | $R_9=+0.4F$ |   |
| VI | 1.52 | 64 |   | $t_6=0.09F$ |
|   |   |   | $R_{10}=\infty$ |   | where F is the focal length of the objective, the refractive index N refers to the D line of the spectrum, V is the dispersive index, $R_1$ to $R_{10}$ are the radii of curvature of the refractive surfaces, $t_1$ to $t_6$ are the thicknesses of the elements, $s_1$ to $s_3$ are the air spaces, and the + and − signs indicate respectively surfaces convex and concave to the front.

7. A high aperture collimating lens system comprising four positive components of which the front one is biconvex with its more strongly curved surface to the front, the second and third are compound meniscus components each with its front surface more strongly convex than that of the component immediately in front of it and each consisting of a biconvex element cemented to the front of a biconcave element whose refractive index is higher than that of the biconvex elements on the average for the two compound components by at least 0.05, and the fourth component is a simple positive element lying wholly within a distance in front of the focal plane smaller than its separation from the third component, the thickness of each of the first three components being greater than either of the two airspaces between them, and the radius of curvature of each of the two cemented surfaces being greater than that of either of the other two surfaces of the same component.

8. A collimating lens system according to claim 7 having an inward curving tangential field image and combined with a reticle consisting of concentric circles on a curved surface substantially matching the curvature of the tangential image.

9. A high aperture optical collimating system lying entirely in front of the focal plane and consisting of an objective and a field correcting lens, the objective consisting of a plurality of positive components each convex to the front of which at least one is compound and each is thicker than any airspace between them, and the field correcting lens consisting of a simple positive element of which the focal power is between one and two times that of the objective, and of which the front surface is convex and the rear surface has dioptric power numerically less than one-half that of the correcting lens as a whole, and which is separated from the rear surface of the objective by a distance greater than its own thickness and lies wholly within a distance of the focal plane less than one-half the radius of curvature of its convex front surface.

WILLY SCHADE.

REFERENCES CITED

The following references are of record in the file of this patent:

UNITED STATES PATENTS

| Number | Name | Date |
|---|---|---|
| 2,003,881 | Grossett et al. | June 4, 1935 |
| 2,160,202 | Fleux | May 30, 1939 |
| 1,610,532 | Russell et al. | Dec. 14, 1926 |
| 1,897,262 | Kitroser | Feb. 14, 1933 |
| 1,539,579 | Kucharski | May 26, 1925 |
| 1,910,115 | Luboshez | May 23, 1933 |
| 2,206,155 | Boegehold | July 2, 1940 |
| 1,476,717 | Kandler et al. | Dec. 11, 1923 |
| 2,050,024 | Sonnefeld | Aug. 4, 1936 |
| 2,324,081 | Herzberger | July 13, 1943 |

FOREIGN PATENTS

| Number | Country | Date |
|---|---|---|
| 679,047 | France | Jan. 5, 1930 |